Figure 1:
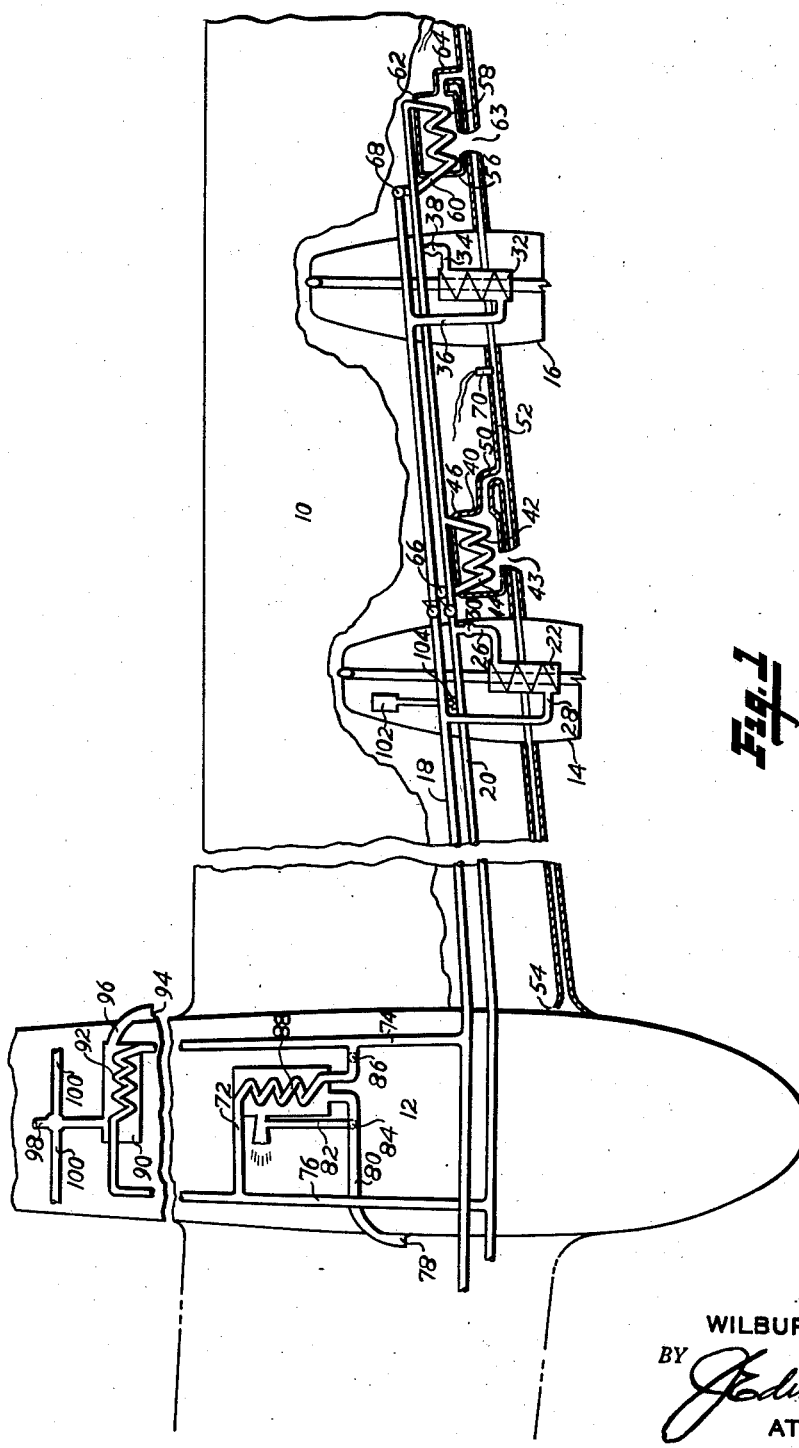

Sept. 7, 1948.   W. W. REASER   2,448,826
AIRCRAFT HEATING AND DEICING SYSTEM
Filed Jan. 30, 1945

INVENTOR.
WILBUR W. REASER
BY Edwin Coates
ATTORNEY

Patented Sept. 7, 1948

2,448,826

UNITED STATES PATENT OFFICE 2,448,826

AIRCRAFT HEATING AND DEICING SYSTEM

Wilbur W. Reaser, Pacific Palisades, Calif., assignor to Douglas Aircraft Company, Inc., Santa Monica, Calif.

Application January 30, 1945, Serial No. 575,218

3 Claims. (Cl. 244—134)

My invention relates to heat interchange apparatus and particularly to such apparatus for use in airplanes.

It is necessary to provide means for heating the cabins of airplanes and while this may be readily effected in small planes, the problem in large passenger planes flying at all heights and under a variety of conditions involves many considerations of cost, convenience to passengers, reliability, and the like, which require careful evaluation in order to obtain the most satisfactory system.

Airplanes of any type have powerful internal combustion motors, and many proposals have been advanced for using the engine exhaust to furnish whatever additional heat is required both for heating the airplane cabin and for preventing ice formation under icing conditions.

Exhaust gases have been used to heat air which was then introduced into the cabin, but since carbon monoxide gas in the exhaust is very poisonous and odorless, the danger exists that exhaust gas leaking into the air may cause illness or asphyxiation of the passengers or crew. In addition, because of the poor specific heat of air, the necessary equipment is unduly bulky and heavy, and back pressure caused by the usual heat exchanger construction causes loss of engine power.

Exhaust gases have also been utilized to generate steam which was used to warm the cabin, but the drawbacks to such a system are numerous. The weight of a steam heating system is about twice that of a hot air system involving as it does a boiler, water tank, valves to control the steam, radiators to recondense the steam, control means to prevent cold air from over cooling the radiator and steam strainers.

In addition, it is necessary to replace the boiler frequently as no way has yet been found to avoid the rapid deterioration of the boiler which results from the excessive fluctuations of temperature to which it is subjected. Also, it is necessary to take precautions against freezing of the water system while the plane is on the ground in cold weather.

At the present time the method most widely used of obtaining heat for cabin warming is to use a separate heater, generally using airplane fuel which is atomized and ignited by a spark plug or flame. This method, however, presents hazards because of the explosive nature of the fuel. Furthermore, it has been found that these burners would not operate well at high altitudes because of the lower air pressure and great cold at such altitudes. Further, in really cold weather or at high altitudes it is sometimes difficult to start the heaters. The weight of such equipment is somewhat high because of necessary auxiliary equipment such as pumps, ignition system, safety casing, etc.

The general object of the invention is to provide a system utilizing the heat of the exhaust to heat a gaseous medium having characteristics which render it peculiarly suitable for heat interchange purposes, the heated medium being used to heat air which is introduced into the cabin of an airplane and may also be used for deicing purposes.

The most suitable gas for use as an intermediate heating agent is helium. This element is non-poisonous, odorless, and relatively inert. Even when brought into contact with metals at red heat no destruction of the metal of the heat exchange unit takes place. Helium will not liquefy above —450° F. and has an extremely stable rate of change of volume with temperature. It is quite inexpensive and may be readily obtained. The heat capacity of helium is five times that of air. Consequently only one fifth the weight flow is needed to carry the same amount of heat as for air at the same temperature difference.

Because of the lesser density and better heat capacity of helium, the use of thinner gauges of metal and ducts of smaller cross section may be used.

A further advantage is that, when using exhaust heat to heat the helium, the heat exchange surface may be considerably reduced, thus reducing the back pressure on the engines.

A still further advantage of the use of helium is that since its thermal conductivity is 5.7 times that of air and since the heat transfer coefficient of any surface is directly proportional to the thermal conductivity of the gas in contact with it, smaller sizes of heat exchangers will give heat transfer equivalent to that of much larger exchangers required if air were to be used as the heat transfer medium.

The net saving in weight for a heating system using helium instead of air as a sole heating medium is roughly 40%, thus permitting the helium to be used in a closed system as an intermediate heating agent, the additional heat exchanging means necessary to transfer the heat of the helium to the air actually used for heating still not increasing the weight of the whole installation to that of a heat exchange installation using air as the sole heating medium.

An object of the invention is to provide heating equipment for airplanes utilizing helium as an intermediate heating medium whereby a material saving in weight of the whole heating equipment is obtained as compared with heating equipment hitherto proposed or at present in use.

A further object of the invention is to provide heating equipment for airplanes utilizing the heat of the engine exhaust for heating helium, the heated helium being in turn used for heating air which is used for heating the airplane cabin and for deicing purposes.

A further object of the invention is to provide a heat exchanger, particularly adapted for use in airplanes, in which helium is used in a closed thermal cycle, thus enabling the gas to be maintained in dry condition and maintained under a desired pressure.

Further objects and features of the invention will hereinafter appear in the following description and/or the accompanying single figure drawing showing in a fragmentary and diagrammatic figure one arrangement of heating and deicing structure is disclosed by way of example only, but it is to be understood that the invention is not in any way limited by this illustrative showing but only by the scope of the appended claims.

In the accompanying diagrammatic drawing, the leading edge of one wing 10 of a four-engined airplane is shown with the skin broken away. The cabin is indicated at 12, an inboard engine at 14, and an outboard engine at 16.

A conduit system comprising a main 18 for hot helium and a main 20 for the return of cooled helium is connected to a muffler 22 surrounding the exhaust pipe of the inboard engine. The cold helium main 20 is connected to one end of the muffler by a connecting pipe 26, the other end of the muffler being connected to the hot helium main by a connecting pipe 28. A pump 30 may be used in the system and is preferably inserted in the run of pipe 26.

The connections are duplicated at the outboard nacelle, the arrangement comprising a muffler 32 surrounding the exhaust pipe of the outboard engine, and pipe 34 connecting the cold helium main 20 to one end of the muffler, and the connecting tube 36 connecting the other end of said muffler to the hot helium main 18. A pump 38 is preferably arranged in the run of pipe 34.

The deicing installation comprises a housing 40 containing a coil 42 connected by pipe 44 to the hot helium main 18 and pipe 46 to cold helium main 20, providing for the passage of heated helium. A ram air intake 48 leads air from adjacent the leading edge of the plane into housing 40 to be heated by the heating coil therein. A connection 50 from the housing 40 conducts the heated air to a heated air deicing duct 52 running along the interior of the leading edge of the wing. The hot air escapes from the duct 52 in any suitable manner, as for instance, through apertures 54 at the fuselage end of the duct, into the interior of the wing.

A second similar casing 56 may be provided containing a heating coil 58 connected by pipe 60 to the hot helium main 18 and pipe 62 to the cold helium main 20 to permit circulation of hot helium through the coil. A ram air intake 63 is provided to lead air into the casing and an outlet duct 64 leads the heated air to the deicer duct 52. The flow of hot helium through the various pipes and heating coils in the manner desired is assured by the pressure established in the hot helium line by pumps 30 and 38.

Valves 66, 68 may be arranged in pipes 44 and 60 and act to control the flow of hot helium to the deicer heating coils.

Thermostats 70 may be arranged in the deicer duct to control the pumps 30 and 38 to ensure that sufficient hot helium is supplied to the deicer system according to the demand placed upon it.

It will be understood that the described heating installation for one wing is duplicated for the other wing of the plane.

The cabin 12 of the plane is heated by means of a heat exchanger 72 connected across a hot helium main 74, and a cold helium main 76 tapped off from the respective mains 18, 20 connected to the engine exhaust heaters. The air to be heated may be admitted to the heat exchanger through air scoop 78 connected to the heater by a duct 80 and also admitted directly to the interior of the cabin by a conduit 82. A valve 84 may be arranged so as to adjust the proportion of air admitted to the heater and that admitted directly to the cabin. A valve 86 may be arranged to control the amount of helium flowing through the heating coil 88.

The heated helium in main 74 is utilized to provide heated air for deicing the leading edge of the stabilizer and vertical fin by leading the hot helium through another heat exchanger 90 containing a heating coil 92 through which the hot helium flows to the cold helium main. Air is admitted to this heat exchanger from a scoop 94 connected to the heat exchanger by conduit 96, the heated air being led through the leading edge of the stabilizer by a conduit 98 and to the leading edge of the vertical stabilizer by conduits 100. The heated air may be exhausted from deicing passages arranged in the leading edges of the stabilizer in any desired manner. Thermostatically operated valves may be utilized to ensure that the amount of helium kept in circulation in this portion is sufficient, similarly to those provided in connection with the deicer.

It will be noted that the helium is circulated in a closed system, and that the only loss that can occur is through leakage at the various junctions which can be reduced to small proportions by suitable construction. In order to make up any such loss a small helium tank 102 is connected to the cold helium main through a pressure responsive valve 104. The helium in the system is preferably maintained at about twenty-five pounds super atmospheric pressure, and the valves 104 will open when the pressure in the cold helium main falls below this value.

While a transport airplane is resting on the ground at an airport without the engines running any heating and air conditioning required can be effected by the usual mobile air conditioning unit employed at airports for this purpose. It will be evident that the use of helium according to my invention enables many valuable advantages to be secured and permits a very reliable and trouble free heating and deicing system to be provided for an airplane. The selective operation of the various valves and pumps and the utilization of the exhaust heat of the engines of the airplane provides a simple yet flexible system requiring a minimum of maintenance and providing a maximum of safety and comfort to passengers.

For the reasons above given the invention is believed to provide a valuable advance in the art of heating and deicing of aircraft.

I claim:

1. A heating system for an aircraft having an internal combustion engine and a wing comprising in combination: conduit means from a closed thermal circuit and including a heat exchanger subjected to the hot exhaust gases from said engine; a substantially non-condensible, non-combustible gas confined in said circuit; means for circulating said gas through said closed circuit to be warmed by said hot exhaust gases; a compartment formed within said wing; heat exchanging means located within said compartment, said compartment having an opening formed in the leading edge of said wing for admitting ram air into the same; and means for conducting the ram air after it has passed over said heat exchanging means along the leading edge of said wing to heat the same and thereby prevent the formation of ice thereon.

2. A heating system for an aircraft having an internal combustion engine and a wing comprising in combination: conduit means forming a closed thermal circuit and including a heat exchanger subjected to the hot exhaust gases from said engine; a substantially non-condensible, non-combustible gas confined in said circuit; means for circulating said gas through said closed circuit to be warmed by said hot exhaust gases; a compartment formed within said wing; heat exchanging means located within said compartment, said compartment having an opening formed in the leading edge of said wing for admitting ram air into the same; a passageway leading from said compartment along the leading edge of said wing to the atmosphere whereby air entering said compartment and warmed by said heat exchanging means is forced by ram pressure through said passageway to heat the leading edge of the wing and thereby prevent the formation of ice thereon.

3. A heating system for an aircraft having a cabin, a wing and an internal combustion engine comprising: conduit means from a closed thermal circuit, said conduit means extending throughout a portion of its length closely adjacent the exhaust gas manifold of said engine; a non-condensible, non-combustible gas confined in said circuit; a plurality of heat exchangers connected into said conduit means, at least one of said heat exchangers being carried within a compartment located within the wing of said aircraft; means for introducing ambient air into said compartment to be heated by said heat exchanger; passageways leading from said compartment and disposed adjacent the leading edge of said wing for conducting heated air along said leading edge, another of said heat exchangers being located within the cabin of said aircraft; means for supplying air from the exterior of said aircraft to said last-named heat exchanger; and means for delivering the air heated by said cabin heat exchanger to the interior of said cabin.

WILBUR W. REASER.

REFERENCES CITED

The following references are of record in the file of this patent:

UNITED STATES PATENTS

| Number | Name | Date |
|---|---|---|
| 1,427,475 | Ishimatsu | Aug. 29, 1922 |
| 1,657,550 | Saathoff | Jan. 31, 1928 |
| 1,961,550 | Carson | June 5, 1934 |
| 2,265,168 | Huffman et al. | Dec. 9, 1941 |
| 2,370,035 | Heymann | Feb. 20, 1945 |
| 2,391,408 | Galamb et al. | Dec. 25, 1945 |

FOREIGN PATENTS

| Number | Country | Date |
|---|---|---|
| 852,358 | France | Oct. 23, 1939 |